United States Patent [19]
Ottinger

[11] 3,872,199
[45] Mar. 18, 1975

[54] METHOD OF MANUFACTURING A FOAMED URETHANE STRUCTURAL PRODUCT HAVING HIGH AND LOW DENSITY PORTIONS

[75] Inventor: Lester V. Ottinger, Danbury

[73] Assignee: Champion International, Corporation, New York, N.Y.

[22] Filed: June 16, 1971

[21] Appl. No.: 153,604

[52] U.S. Cl.............. 264/46.4, 52/309, 52/316, 161/124, 161/159, 161/160, 161/166, 264/52, 264/54, 264/46.3, 264/92, 264/309, 425/4 C, 425/134, 425/224
[51] Int. Cl............................................. B29d 27/04
[58] Field of Search ........... 264/46, 45, 54, 46, 338, 264/47; 156/78, 79, ; 117/104 R, 105.5; 161/161; 52/309, 316; 425/4 C, 134, 224

[56] References Cited
UNITED STATES PATENTS

| | | | |
|---|---|---|---|
| 2,586,275 | 2/1952 | Toulmin | 264/46 |
| 2,779,689 | 1/1957 | Reis | 264/54 X |
| 2,827,665 | 3/1958 | Rogers et al. | 264/54 |
| 3,009,209 | 11/1961 | Weinbrenner et al. | 264/54 |
| 3,020,587 | 2/1962 | Alderfer et al. | 264/46 |
| 3,052,927 | 9/1962 | Hoppe et al. | 264/46 |
| 3,081,487 | 3/1963 | Heffner et al. | 264/54 X |
| 3,091,551 | 5/1963 | Robertson | 117/105.5 |
| 3,096,001 | 7/1963 | Boe et al. | 117/104 R X |
| 3,099,516 | 7/1963 | Henrickson | 264/48 MX |
| 3,156,748 | 11/1964 | Roth | 264/48 |
| 3,216,849 | 11/1965 | Jacobs | 264/54 X |
| 3,249,304 | 5/1966 | Faro et al. | 117/105.5 X |
| 3,298,884 | 1/1967 | Willy | 264/47 X |
| 3,366,718 | 1/1968 | Komada | 264/54 X |
| 3,487,134 | 12/1969 | Burr | 264/45 |
| 3,550,673 | 12/1970 | Gallagher et al. | 161/190 X |
| 3,657,036 | 4/1972 | Mullenhoff et al. | 156/79 |

FOREIGN PATENTS OR APPLICATIONS

| | | | |
|---|---|---|---|
| 745,121 | 10/1966 | Canada | 264/47 |
| 760,937 | 6/1967 | Canada | 117/104 R |
| 1,164,323 | 9/1969 | Great Britain | 161/161 |
| 624,114 | 7/1961 | Canada | 264/338 |

OTHER PUBLICATIONS

Ritzinger, G. B., "Reactant Temperature: its Effect on Foaming Characteristics and Properties of Rigid Foam," Wilmington, Del., Blastomer Chemicals Dept., B. I. Dupont De Nours & Co. (Inc.), June 3, 1960, 2 pp.

Kirk—Othmer Encyclopedia of Chemcial Technology, second completely revised edition, Vol. 21, New York, Interscience, c 1970, pp. 90–106.

*Primary Examiner*—Philip E. Anderson
*Attorney, Agent, or Firm*—Evelyn M. Sommer, Esq.; James M. Heilman, Esq.; Anthony J. Casella, Esq.

[57] ABSTRACT

Invention covers high quality molded urethane structural products comprising a unique mixture of a high density foam and a low density foam and a high speed process for manufacturing the same. In essence, two (or more) urethane formulations are spray applied from one (or more) bank of application nozzles. The initial spray cures almost immediately and is of high density while the secondary spray slightly overlaps, cures slightly slower, and is of a relatively low density.

13 Claims, 13 Drawing Figures

INVENTOR
LESTER V. OTTINGER

BY *James M. Heilman*
ATTORNEY.

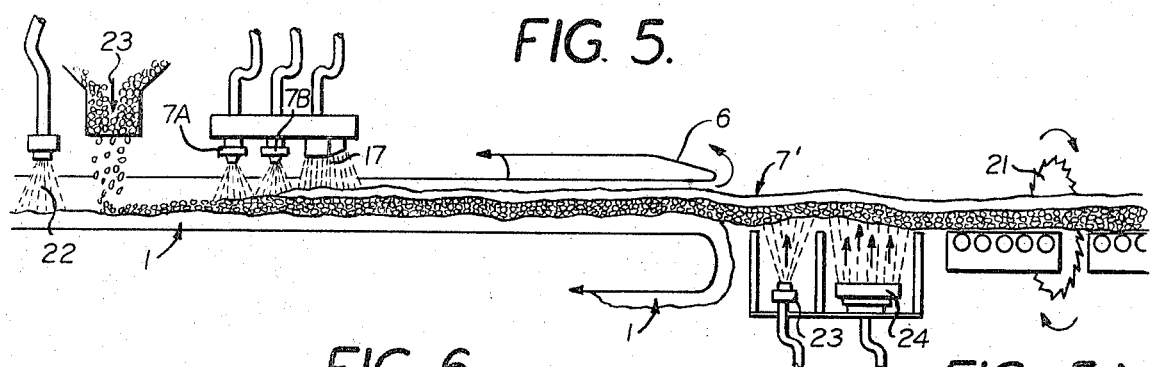
FIG. 5.
FIG. 6.
FIG. 5A.
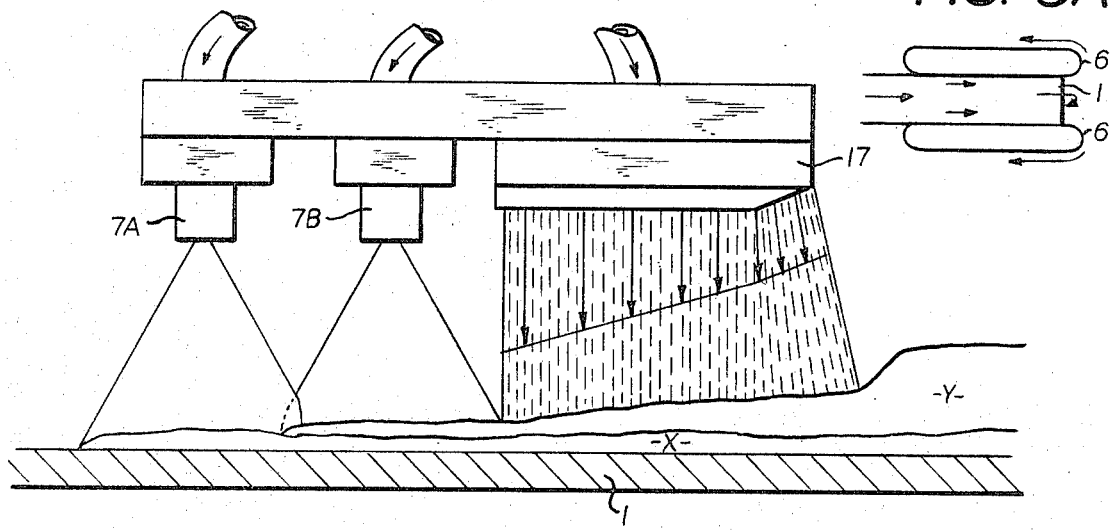
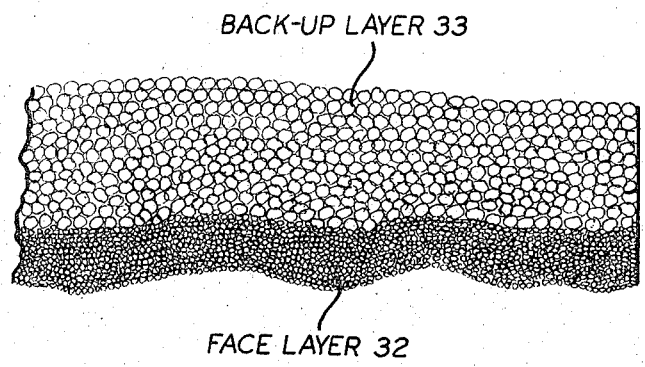
FIG. 7.
BACK-UP LAYER 33
FACE LAYER 32
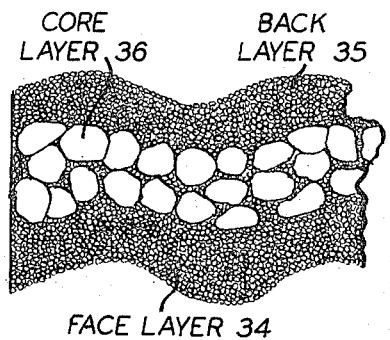
FIG. 8.
CORE LAYER 36
BACK LAYER 35
FACE LAYER 34

METHOD OF MANUFACTURING A FOAMED URETHANE STRUCTURAL PRODUCT HAVING HIGH AND LOW DENSITY PORTIONS

The use of urethane foams and the method of manufacture are well known in the art. The present invention is concerned with urethane foam such as described in "Encyclopedia of Chemical Technology," Kirt-Othmer, Second Edition, Volume 21, pages 84–94, published Interscience Publishers, a division of John Wiley and Sons, Inc., 605 Third Ave., New York, N.Y. The present invention is concerned with high quality urethane molded structural elements and with a spray application and open back molding technique wherein the foam is sprayed into an open mold and wherein two (or more) sprays or one (or more) spray banks are used.

In conventional molding of urethane foams, considerable pressure on the mold is generated by the foaming action of the urethane. As a result of the polymerization of the urethane resins (which is an exothermic reaction-generates high heat) an internal liquid blowing agent is caused to boil releasing bubbles. These expand the volume of the foam and force the resin into all mold detail. This high internal pressure makes very sturdy molds necessary, or the use of restraining presses to prevent the foam from warping the mold. The pressure exerted by the foam causes the catalyst to migrate through the barrier coating (that has previously been put into the mold) into the silicone elastomer itself. After many molding cycles each of 10-20 minutes duration, some of the chemicals which have migrated into the silicone rubber start bonding with new foam parts being produced. As the part is demolded, this bond causes "chunk-out" (small pieces of silicone rubber tearing loose) which is one of the major causes of mold degradation. With the present process, practically no pressure is exerted on the mold medium, thus eliminating the need for heavy weight and bulky mold frames. A second and more vital result of eliminating high pressures and greatly reducing mold dwell time is a tremendous extension in mold life. With the foam exerting little pressure on the mold surface, catalyst or other chemical migration through the barrier coating in the mold is practically eliminated. Therefore increased mold life for silicone, urethane or other elastomer molds will be at least four to five times as long with the present process than with conventional closed molding techniques.

When attempting to mold articles having very thick sections, conventional urethane molding is not practical. To lower the cost of a conventionally produced part, it is necessary to lower the density of the foam which reduces its effectiveness to withstand impact or surface abrasion. The only way to solve this problem is to use a urethane foam that is self-skinning. This would be a urethane which could be placed into the mold in one shot and as it expands and foams, it creates a skinned layer on its periphery with a low density core. To date, there are a few self-skinning foams available but they are highly restrictive as to (1) the thickness of the skin formed, usually less than one-eighth of an inch, and (2) in the achievable difference in density between the formed skin and the core. Also, the uniformity of skin thickness cannot be controlled in a heavily textured or contoured mold. Satisfactory products have only been made in primarily flat sheets. With the present technique, which consists of a specific sequence of mechanical applications, it is possible to form a continuous, closely controlled thickness of any density urethane foam in as many different layers as desired with each layer being capable of having its own density without dependency on what the density is of contacting layers. Even though this is a mechanical application of layers, it is done in a sequence which allows permanent and integrated bonding of one layer to the other resulting in a homogeneous molecular structure, multi-density, controllably engineered product with predeterminable end product characteristics.

This present process is made possible through the modification and innovation in spray equipment for applying the required raw materials to the molding surface. The high quality of the finish of the resultant article is provided by the process with a tremendous reduction in mold abuse with the added advantage of being able to engineer the product to meet specific end use requirements.

This invention allows molding of a foamed thermoset or thermoplastic article by means of a specific sequence of applications at prescribed temperatures and pressures, maintaining the degree of mold fidelity equal to conventional closed molding, or gravity molding, of thermoset or thermoplastic materials. Innovations in spray equipment, specifically related to the nozzle involved, and the means in which raw materials are applied, allows for the controlled deposition of materials in layers of various densities but cures to be a homogeneous molecular structured part throughout, without sharp definition of density change interfaces.

The temperature of the mold is preferably maintained slightly above the processing temperature of the plastic material thus maintaining the optimum in mold detail fidelity in the resultant part as well as maximizing the bond of the plastic material with the prime coat which has previously been applied to the mold. This prime coat comes out of the mold with the formed part and serves as a base color coat as well as the prime coat for better adhesion of post finishing steps (this prime coat is not a necessity but allows extension of mold life and eliminates several steps from the finishing operation).

The present invention may be readily understood by reference to the diagrammatical drawings illustrating embodiments of the same.

FIGS. 3, 4 and 5 show in some detail the dual spray technique of the present invention, while FIG. 5A is a plan of the side guide belts 6 shown schematically in FIG. 5.

FIG. 6 illustrates one technique of reducing the intensity of the hot air blast;

FIGS. 7, 8, 9, 10 and 11 illustrate other molded parts or elements produced in accordance with the present process.

Figure 1:
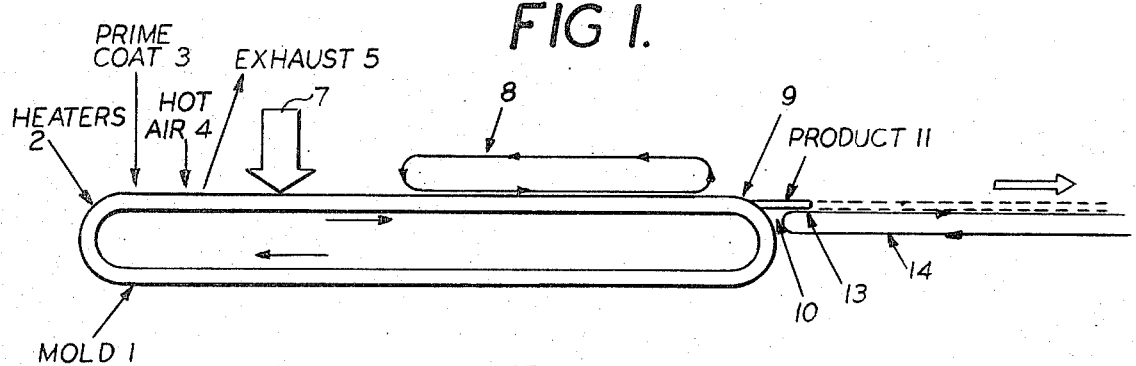
FIG. 1 illustrates a preferred sequence of processing steps or stages.

Referring specifically to FIG. 1, a continuous, or linked section, mold 1, preferably with heaters 2, rotates as shown. This mold-belt may be made of any suitable flexible material such as, "Dow Corning Silastic E RTV Silicone Rubber." This mold-belt element moves by the various processing stations. It first passes by a bank of heaters 2 where the mold temperature is raised to about 120°F to about 160°F, preferably about 140°F. The barrier prime coat is applied, preferably by spraying. This barrier coat may be any suitable material as for example, a Dow Corning 509 barrier Coat — 15% solid solution in methyl isobutyl ketone with a viscosity of 50 centistokes. The coat is applied by spray with a line pressure of 20 psi. The thickness of the coating may be varied but preferably is about 0.0002 inch to 0.0005 inch dry film thickness.

** Trademark-DuPont Co.

This barrier coat facilitates the removal of the fabricated structural element from the mold 1, and also functions as a prime and base color coat for the finishing of the formed structural element or part.

Immediately after the barrier prime coat is applied to the mold, a hot air blast is applied at 4 to speed its cure. The temperature of the hot air is in the range of about 90°F to 150°F, such as about 125°F. Following the hot air application at station 4, exhaust means 5 are applied to draw off solvents that might impair the formation of the structural part in the mold which involves urethane foaming chemical reactions. At point or station 7 the form is ready to receive the dual application of urethane foam which dual application will be hereinafter more specifically described.

The form or mold containing the expanding urethane foam passes under a molding belt surface 8 so that a flat back of the formed part is secured. This element however is optional. Mold separating flanges 9 allow the molded part 11 to be removed from mold 1 and to be picked up by vacuum 13 action on conveyor 14 and held in place for subsequent finishing operations. Air blast 10 helps dislodge part 11, which may be a small individual part or a large continuous part.

Figure 2:
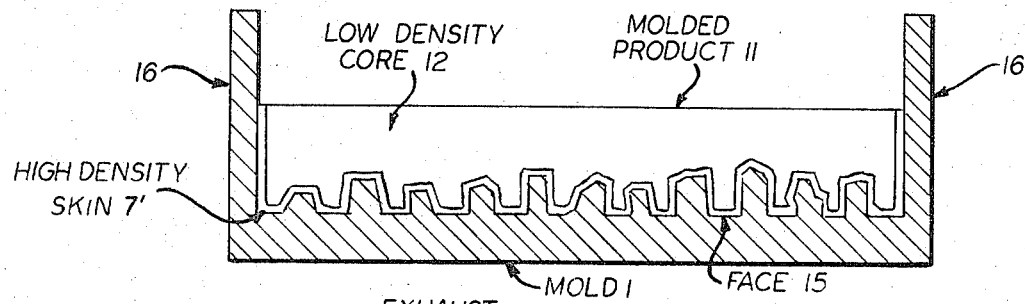
FIG. 2 illustrates a typical part and its mold, being a cross sectional view thereof.

Referring specifically to FIG. 2, an end view of one type of molded product is illustrated and also an end view of the mold to make the same. The formed urethane foam element 11 is molded on the face 15 of mold 1 between sides 16 of the mold as described. The skin 7' is of relatively high density while the core 12 is of relatively low density.

Figure 3:
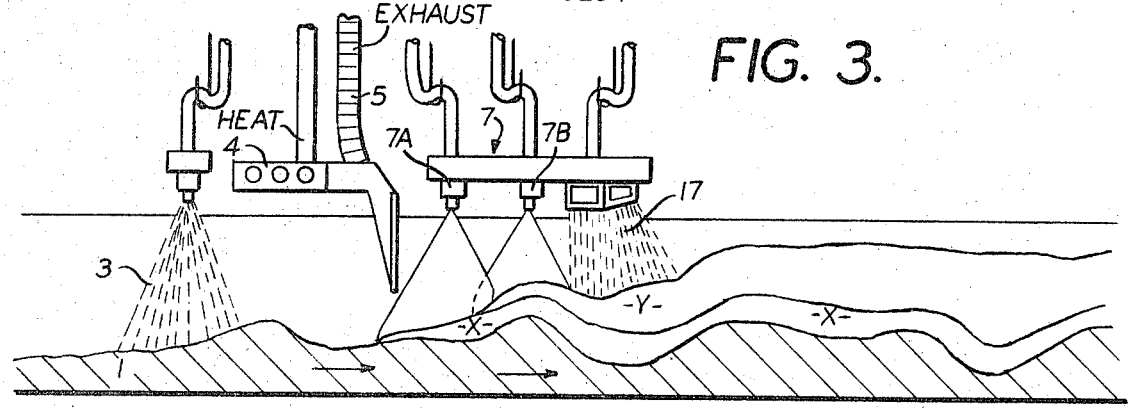
Figure 4:
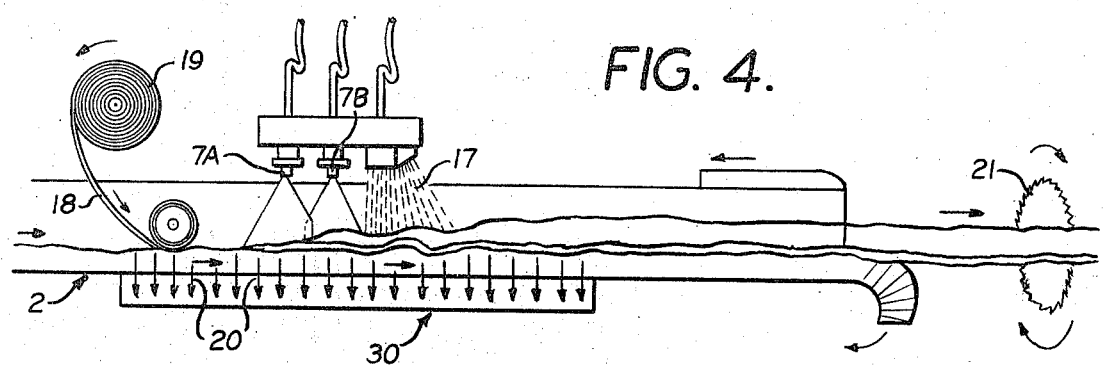

Referring to FIG. 3, continuous belt-mold 1 preferably after being heated by heaters 2 as illustrated in FIGS. 1 and 4, moves under application spray station 3 of barrier prime coating. This, under certain conditions, may be omitted. Heat is applied by heaters 4 in order to facilitate the curing of this release coat, and fumes are exhausted by fan means 5.

The dual foam applicator 7 consists of an initial bank of nozzles 7A that apply the foam formulation that gives the relatively high density foam (layer X) and a secondary bank of nozzles 7B for the application of a relatively low density backing or core (foam layer Y). The foams are those as described in the above mentioned literature art.

The high density foam is preferably in the range from about 10 to 30 lbs/ft³, such as about 25 lbs/ft³, while the low density foam is preferably in the range from about 2 to 4 lbs/ft³, such as about 3 lbs/ft³. The thickness of the high density coat as applied is about one-sixteenth inch to one-half inch, such as about one-fourth inch. Following the application of the back up low density layer of urethane foam the reacting and volume expanding foam is subjected to an auxiliary hot air blast 17 in order to expedite the cure and improve the mold detail pickup. The initial high density foam application 7A forms a layer (x). This layer (x) expands only about 15% to 20% of its original volume and does so almost immediately upon contact with the mold.

The back-up or core layer Y from bank 7B is sprayed simultaneously with a slight overlap of about one-fourth inch to 1 inch, such as about one-half inch. It is obvious that the speed of the mold will determine the thickness of the respective layers for a uniform fixed rate of application from the sprayers. The cured foam thickness of the combined layers is about 3 inches for the specific product described.

Face layer X must be of sufficient "green strength" when layer Y is applied so that its cell structure is not destroyed by the secondary spray application. The overlap of sprays 7A and 7B blends a small amount of each foam material so that even though layer X has "green strength" which would otherwise decrease a bond with subsequent applications, no line of demarcation of layers exists. Thus there is no point or line of structural part weakness due to inadequate bonds of different layers of one with the other. Layer Y begins to foam when applied and when unrestrained increases its volume about 20 to 50 times, such as about 30 fold. As it begins to foam, the blast of hot air 17 is directed so that as the heat facilitates foam expansion, the air pressure holds or retards the foam expansion. The foam therefore as it expands forces itself into the mold details. The hot air blast decreases in intensity so that it is just strong enough to repress cell expansion within the foam without rupturing the cells on their internal pressure increases. The intensity of the blast of hot air as the molded foam leaves the blast is about 10% to 40%, such as about 20% of the intensity of the blast when the molded foam first contacts the blast.

As the mold-belt continues to move, the applied layers leave the air blast 17 and the still foaming back layer Y expands freely to its full height and cures. Due to the air blast and low viscosity of the layer Y as well as its slow cure time as compared to X, more material collects in the lower part of the mold. Thus, more material will rise and compensate for a low part of the mold. Thus, a self-regulating action occurs to produce a part with a relatively flat back.

Referring specifically to FIG. 4, the elements are similar to those described with respect to 3 except the barrier coat application has been eliminated. Instead, a plastic sheet of film 18 is introduced from holder 19. The mold is replaced with a modified belt 20 drilled with small diameter holes (one-thirty-seconds inch), or is made of an open celled or open weave material to allow air to move through it but across its thickness only. As this mold moves, film holder 19 continuously supplies material 18 down into the mold 1. As the mold moves on, it passes over a bed 30 that draws a vacuum through the mold and pulls the film or sheet material downward against the mold surface and holds it there through spray foam application station 7 and releases the vacuum when the foam is cured. This mold is automatically stripped and the film surfaced part moves on to a cutter 21 or other subsequent sizing and packaging operations.

FIG. 5 shows an adaption wherein an adhesive 22 is applied to mold 1 to adhere aggregate 23. These materials are introduced into the mold prior to applying the dual foam at 7A and 7B. Air and adhesive solvent blast 23' aids in the removal of loose unbonded aggregate from the molded part while air blast 24 aids in drying the cleansed product face.

The method of decreasing the intensity of the hot air blast 17 is shown in FIG. 6. The individual jets in the direction of movement of the mold are designed by any suitable means to secure a less intense blast or pressure as designated by the length of the respective arrows.

Referring specifically to FIGS. 7, 8, 9, 10 and 11, various structural molded elements are shown. FIG. 7 illustrates a high density (small air cells) face layer 32 and low density back-up layer 33 part construction. FIG. 8 illustrates a three layer part construction 34, 35 and 36 with each layer at a different density. In all interfaces of different density layers the lines of demarcation are eliminated since the materials are applied as described so as to expand together and form a homogeneous part. By the present technique it is possible to change the thickness at any layer and the density of any layer by merely altering equipment controls.

Figure 9:
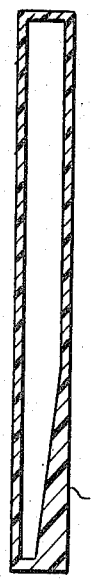
Figure 10:
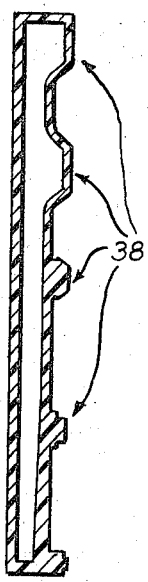
Figure 11:
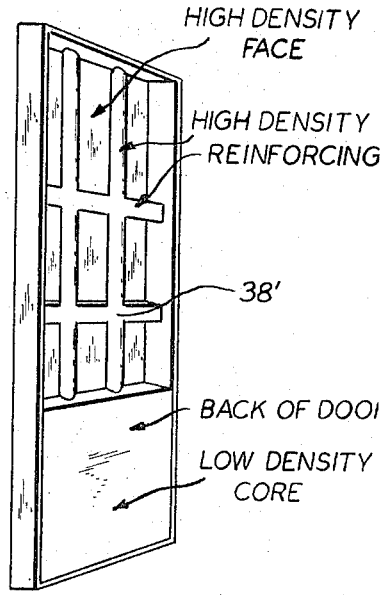

In FIGS. 9, 10 and 11 it is shown how by controlling the movement of the spray unit over the mold it is possible to alter layer thickness in the molded part to meet specific part needs. s FIGS. 9 and 10 illustrate sections of doors. In FIG. 9 the high density layer for the face has been increased in thickness at its bottom 37 where kicking causes door damage. In FIG. 10 the same thing has been done but there is also added the thicker layer areas 38 where pressure may cause damage as a concentrated load at that point on the door.

FIG. 11 illustrates integrally formed reinforcing ribs 38' made by extra spray passes of only the high density component in these areas prior to application of the low density core material.

Figure 12:
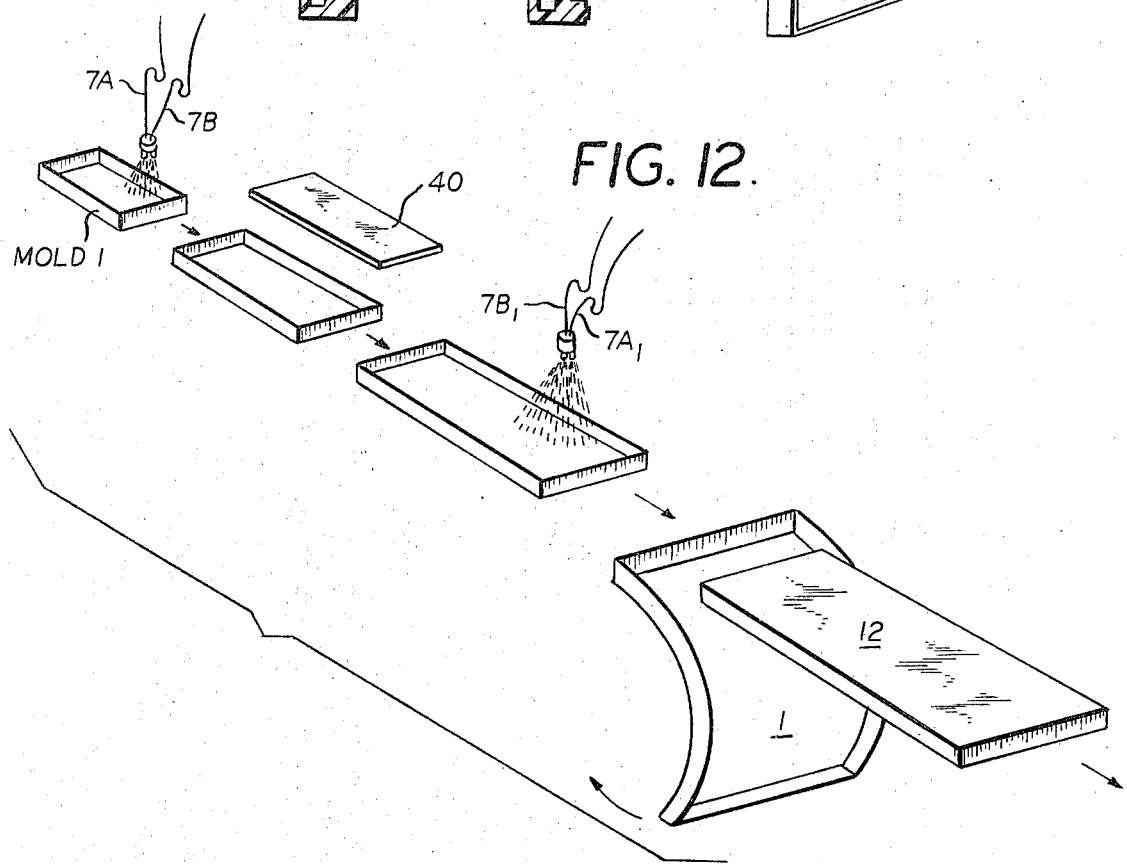
FIG. 12 illustrates the steps in producing a molded structural element in accordance with the present process with each exterior surface having a layer of high density foam backed up by a layer of low density foam and the total encapsulating of a reinforcing sheet.

Referring specifically to FIG. 12, the method of manufacture is as hereinbefore described. FIG. 12 diagrammatically illustrates a technique of manufacturing a molded structural element, such as a door wherein each face comprises a layer of high density foam backed up by a layer of low density foam. Mold 1 is first contacted with a quantity of high density foam from 7A and then with a quantity of low density foam from 7B applied as described and as shown in FIG. 3. A reinforcing sheet 40 is then applied. A low density foam is supplied from $7B_1$ and then a high density foam from spray $7A_1$. The finished molded product 12 is then removed from mold 1.

Thus, in accordance with the present invention molded urethane foam structural elements or parts are produced. By the present process foam and cure completion times are reduced to one minute or less as compared to 10 to 20 minutes required by conventional techniques. Also since the mold is open, negligible, if any, pressures are involved and parts can be produced as large as desired, for example 10 feet × 70 feet.

Parts produced with this techinque can have rigid walls which, in cross-section, have a dense surface zone and an integrally formed cellular core. The rigidity of an article varies with the cube of the thickness and varies in approximately an inverse proportion to changes in density. Thus, the low density cellular core with high density cellular walls as a construction has greater flexural strength than a uniform higher density wall of the same weight of material. The placement of the denser layer further enhances the flexural strength because, in the exterior zone where it is placed, the flexural stresses are the greatest. In addition to the high strength characteristics of the high density surface area — low density interior construction, decreased heat conductivity and, consequently, increased insulation properties are provided over conventional uniform high density urethane parts, due to the increase in internal gas bubbles or cells without loss of surface impact resistance.

The various types of additives, fillers and/or reinforcing fibers which can be employed to produce a change in the physical properties of a resultant molded product must be mixed with the plastic material in other processing techniques at an early stage of raw material mixing. With the present process, it is possible to add these agents directly to the mold while the plastic material is still in a liquid state thereby obtaining a uniform dispersal of the material within the molten plastic. This is done without employing additional mixing apparatus thereby maintaining a high degree of control, in the molded product wherein the filler, reinforcing fiber, or liquid additive is placed.

In conventional urethane casting, mold temperatures above 150°F induce mold fill problems. This degree of temperature causes premature blowing of the foam and increased polymer viscosity. This inhibits the spreading of the material evenly over the mold surface which results in unwanted, uncontrollable variations in densities and incomplete mold filling.

With the present process it is advantageous to have mold temperatures in the 175°–200°F range. With the sequential mechanical application as described, the polymeric material (which is highly catalyzed) needs to cure almost immediately on contact with the mold. This rapid cure prevents sagging on highly contoured mold surfaces and prohibits seepage of polymer to the face side of any decorative foreign materials (such as stone aggregate) previously placed in the mold. The faster the cure time, the more production per mold and less cost per produced item. Also, with limited dwell time in the mold, catalyst migration (main cause of mold deterioration) is nearly eliminated and mold life (usually 200–300 parts with conventional molding techniques) is tremendously increased (on the order of 1,000–3,000%).

Molds for thickwall parts (4 inches or more thick) for conventional urethane molding are extremely costly because of the high pressures they must withstand. Conventional molding of medium to high density (8–30 $lb/ft^3$) foams generate pressures of 10–15 psi. For a 3 feet-0 inch × 6 feet × 1¾ inches door, the mold must stand approximately 43,200 lbs of pressure with conventional techniques. The present process exerts no pressure on the mold.

During urethane molding the reaction of the isocyanate groups with hydroxyl groups is exothermic, and in conventional urethane foam molding the production of thick sections of high density foam generates large amounts of heat. This heat causes internal scorch and splits and fissures within the foam. The present process using open molds allows the heat to dissipate rapidly as soon as polymerization is sufficiently completed thus eliminating scorch or splitting problems. With this process new formulations with greater emphasis on the silicone surfactants will allow extremely rapid cell growth. The normal tendency of cell bubbles to collapse, particularly as the temperatures of the foaming polymer increases, is magnified by the high initial operating temperatures of the polyol and isocyanate materials as well as the increased mold temperatures of the present processing technique. Therefore, the proper silicone surfactants are critical to lowering of surface tension and aiding nucleation which gives cell stability at rapid processing rates.

The invention may be more fully understood by the following examples illustrating the same.

Example 1. Manufacture of interior wall panels.

Continuous or individual silicone elastomeric molds are heated to 175°–200°F. A barrier coat is sprayed into the mold. This barrier coat acts as both a mold release agent and initial prime or color coat on the produced part. The solvent is flashed off with forced hot air and a following exhaust. The high density outer skin formula is spray applied as described previously to achieve a cured thickness of three-sixteenths inch. The polyol temperature is 135°F; the isocyanate 115°F. Both materials are applied under 575 psi line pressure. The core or low density formula to achieve a cured thickness of thirteenth-sixteenths inch is applied almost immediately and actually slightly overlaps the high density spray. The polyol of the low density is applied as 120°F; the isocyanate at 95°F. Both materials are applied under 400 psi line pressure. The two layers interact (as previously described in the disclosure) and cure. Whether open mold or closed molded just prior to completed cure, the remainder of operations are handled with normal material handling equipment.

Example 2

Manufacture of film or sheet material, surfaced products. Tedlar** film for siding products in particular is used, but any film or sheet material (such as wood veneer for interior or exterior usage) may also be used.

The new feature of this concept is the placing of the supporting substrate onto the film instead of laminating the film onto the supporting substrate. It is possible to maintain support and shaping of the film during processing by two methods: (A) tensioned over a perimeter-type frame, or (B) held in a mold with a vacuum. Once the film is positioned and shaped, the polymer application process described in manufacturing Example 1 above is followed. A roll of Tedlar** is continuously feeding the film under infra-red heaters bringing film temperatures to 220°–280°F. The film progresses into a stretching apparatus that puts tension on the film in both axial directions (90° apart in the same plane as the film). The film then passes under a soft rubber roll that causes the film to come into contact with the continuously revolving mold surface as shown in FIG. 3B. The mold can be perforated (each mold contour requires different size and location of perforations), or be of an open celled or open weave material to allow air to move through it but across its thickness only. The film makes contact with the mold over a vacuum box (18 to 26 inches Hg. vacuum depending on mold configurations) under the mold which draws the film down into the preheated mold (170°–180°F) picking up all of the mold's detail. Some simple configurations allow use of high volume exhaust fans to cause air pressure differential instead of vacuum to hold down the film. A nip roll of flexible material (rubber, for example), with a Shore A durometer of 45 to 60 presses the film against the mold surface causing the film to conform to the mold profile. The polymer application station is immediately after this film positioning station. The polymers are applied (as previously explained in manufacturing Example 1) and cured as the mold continues to move away from the application station (still over the vacuum area). Where the foam has completed the cure, the vacuum area stops. The mold continues on for a few feet then turns downward pulling itself away from the continuously formed product. The product moves on to the cutting, trimming, and packaging stations.

* Trademark-Dow Corning Co.

Example 3

Manufacture of aggregate surfaced exterior and/or interior building panels (aggregate may be other than stone-e.g., wood chips, plastic particles, etc.).

A continuously moving mold-belt (temp. 200°F) receives an evenly (or designed layout) bed of aggregate designated the primary pattern material. This material is hot — 170°–190°F. A second and third pattern material can be added if desired. These too, must be heated. Just prior to polymer application, a barrier layer of fine particles, for example, sand, (150°–165°F) is sprinkled over the deposited pattern material and any residue on upper surfaces is blown off. This layer serves as a face coating preventing any urethane from being exposed between the larger pattern aggregate. Exposure to ultra-violet radiation causes polymer degradation so the sand (or other fine particles) is required to prevent this action. The next station is for polymer application. After the polymers have cured, the mold moves away from the product and any loose aggregate or sand is caught and recycled. As the aggregate and sand serve to eliminate polymer-mold contact, no mold release agent is required. The panel continues on to panel trimming and packaging.

Example 4

Manufacture of reinforced panels and doors. Producing reinforced products can be done three ways.

1. A reinforcing sheet (e.g., one-half inch Novoply,*** one-half inch plywoood, etc.) is sandwiched in the middle of the product during processing.

2. A reinforcing sheet of material is applied to the back of the product either immediately after the last step of processing the polymer or as a post-processing application (glued on after polymer is cured).

3. Reinforcing ribs, stiles, rails or framework (aluminum, wood, plastic, etc.) are inserted into the mold during processing to become an integral and totally incapsulated (optional — some areas can be left exposed for hardware application) product reinforcement.

Example 5

Manufacture of sheet, molding or beam products coated with urethane foam with the design formed by a contacting mold-belt.

A sheet (or molding or beam) of plywood, Novoply,*** or lauan, for example, passes through heaters bringing its surface temperature to 180°F. It then passes under the spray equipment but the sprays are reversed — the low density is applied first (can be omitted) and then the high density is applied. Immediately after the polymers are applied, a rubber mold comes into contact with the surface and remains in contact for a few seconds as the material foams and cures and is shaped to the surface design of the mold. The mold is then pulled away from the foam decorated product and recycles to mold again.

***Trademark Champion International Corporation

The advantages of this process especially for low grade plywood (open knots, splits, etc.) and lauan (core voids) is that the foam fills all unwanted deficiencies while giving nearly any grain or pattern desired to the polymer surface. The process is readily adaptable to current in-line prefinished panel manufacturing procedures (at reduced line speeds). The cost of the product over a completely plastic panel is reduced because the substrate acts as the self-supporting structure and the urethane foam as a decorative and mar resistant element of the product.

The embodiments of the invention in which an exclusive property is claimed are defined as follows:

1. Process for manufacturing a high quality molded urethane structural product which comprises introducing a relatively high density foamable urethane mixture into a moving mold from a first spray applicator, subsequently continuously introducing additional relatively low density foamable urethane mixture into said mold from a second spray applicator in a manner that the spray from said second applicator slightly overlaps the spray from said first applicator, and in a manner that the foamable urethane mixture from said second applicator completely covers the foamable urethane mixture from said first applicator in said mold.

2. Process as defined in claim 1 wherein the foamable urethane mixture from said first applicator has a density in the range from about 10 to 30 lbs/ft$^3$ and wherein the foamable urethane mixture from said second applicator has a density in the range from about 2 to 4 lbs/ft$^3$.

3. Process as defined by claim 2 wherein the thickness of the applied relatively high density foamable urethane mixture is about one-sixteenth inch to one-half inch and wherein the thickness of the applied relatively low density foamable urethane mixture is about one-fourth inch to 1 inch.

4. Process as defined by claim 1 wherein the foamable urethane mixture from said second applicator overlaps the foamable urethane mixture from said first applicator by about one-fourth inch to 1 inch.

5. Process as defined by claim 1 wherein a primer barrier coat is first introduced into said mold.

6. Process as defined by claim 5 wherein said barrier coat is dissolved in methyl isobutyl ketone and applied to a thickness of about 0.0002 inch to 0.0005 inch.

7. Process as defined by claim 1 wherein said mold is first heated to a temperature in the range from about 120°F to 160°F.

8. Process for manufacturing a high quality molded urethane structural product which comprises preheating a flexible moving mold to a temperature in the range from about 120°F to 160°F, introducing into said mold a relatively high density foamable urethane mixture having a density in the range from about 10 to 30 lb/ft$^3$, then introducing a relatively low density foamable urethane mixture into said mold from a second spray applicator, said relatively low density foamable mixture having a density in the range from about 2 to 4 lb/ft$^3$, and in a manner that the spray from said second applicator slightly overlaps the spray from said first applicator, and in a manner that the foamable urethane mixture from said second applicator completely covers the foamable urethane mixture from said first applicator in said mold, applying a hot air blast to said foamable urethane mixture as they expand in a manner to retard foam expansion, and thereafter receiving said molded urethane products.

9. Process as defined in claim 8 wherein said relatively high density foamable urethane mixture is first applied to a thickness in the range of about one-sixteenth inch to one-fourth inch and wherein said relatively low density foamable urethane mixture is first applied to a thickness in the range of about one-fourth inch to 1 inch and wherein said mixtures expand to a thickness of about 3 inches, said mixtures being applied in a manner that the spray from said second applicator overlaps the spray from said first applicator and wherein the intensity of the hot air blast which retards foam expansion decreases in the direction of the movement of the mold.

10. Process as defined by claim 9 wherein the relatively high density foamable urethane mixture has a density of about 25 lb/ft$^3$ and wherein the relatively low density foamable urethane mixture has a density of about 3 lb/ft$^3$.

11. Process for the manufacture of a high quality molded urethane structural product which comprises preheating a moving mold, introducing a relatively high density foamable urethane mixture into said moving mold from a first spray applicator, subsequently continuously introducing a relatively low density urethane mixture into said mold from a second spray applicator in a manner that the spray from said second applicator slightly overlaps the spray from said first applicator, and in a manner that the foamable urethane mixture from said second applicator completely covers the foamable urethane mixture from said first applicator in said mold, and maintaining forming conditions to secure an expansion increase of said relatively high density foamable urethane mixture to about 15% to 20% of its original volume and expansion increase of said relatively low density foamable urethane mixture to about 20 to 50 times its original volume, and subjecting said foamable urethane mixtures in said mold to an air blast, the intensity of which decreases in the direction of movement of said moving mold.

12. Process as defined in claim 11 wherein subsequent to said air blast a reinforcing sheet is securely positioned above said relatively low density foamable urethane mixture, followed by the introduction of a second relatively low density foamable urethane mixture onto said reinforcing sheet, followed by the introduction of a second relatively high density foamable urethane mixture in a manner to overlap the introduction of said second relatively low density foamable urethane mixture, and subjecting said second mixtures to a final air blast which decreases in the direction of movement of said moving mold.

13. Process as defined by claim 12 wherein said overlaps are about one-fourth inch to 1 inch, wherein said relatively high density foamable urethane mixtures are about 10 to 30 lbs ft$^3$ and said relatively low density foamable urethane mixtures are about 2 to 4 lbs ft$^3$, and wherein said final air blast decreases to about 10% to 40% of the intensity of the blast when said second mixtures first contact said final air blast.

* * * * *